Patented May 26, 1942

2,283,937

UNITED STATES PATENT OFFICE 2,283,937

PREPARATION OF PAVING COMPOSITIONS

Charles Mack, Sarnia, Ontario, Canada, assignor to Standard Oil Development Company, a corporation of Delaware No Drawing. Application June 4, 1937, Serial No. 146,371

12 Claims. (Cl. 106—269)

This invention relates to improvements in paving mixtures and more particularly it relates to improvements in the adhesion of the bituminous constituents and the mineral aggregate.

In the laying of bituminous pavements, the mineral aggregates used are those that are most available in the region where the pavements are being constructed. It has often been found in the past that some bituminous pavements begin to ravel badly during the first winter and go to pieces. On examining these pavements, it is generally found that the bottom part of the pavements in contact with moisture from the foundation were washed entirely free of asphalt, or that surface moisture disintegrated the mixture. An analysis of these aggregates disclosed the presence of sodium and potassium in most every case. This was especially true with a great variety of mineral aggregates irrespective of their main constituents. Aggregates, such as of flint, beach sand, clay, limestone or silica, were also found to contain sodium and potassium and thereby have higher pH values than aggregates of the same type free of alkalies.

An object of this invention is to improve the adhesion between bituminous materials and aggregates that have high pH values. Other objects of the invention will be understood on reading the following description of the process.

According to this invention, the adhesion of the bituminous constituents of a paving mixture and the mineral aggregate is improved by treating the mineral aggregate with a base exchange agent such as aqueous solutions of water-soluble salts of metal bases.

The salts of the metal bases most suitable were determined by a study of the behavior of the treated aggregates towards wetting agents in the presence of water, the wetting agents used being the bottoms obtained on subjecting oxidized paraffin wax to vacuum distillation at high temperatures, tar still pitch, (a residue of the tar formed by partial cracking) and degras. The base exchange agents that were found to be effective were the water-soluble metallic salts of the metals of the qualitative analytic silver, copper, aluminium and iron groups.

In the case of flint and beach sand, which mainly contain silica, hydrochloric acid may also be used to extract the alkalies and thereby reduce the pH value. Lime, slaked or unslaked, was also found to improve the adhesion of the mineral aggregate and bituminous materials. This is particularly true when the aggregates had weathered or contain some clay. The effects of treated mineral aggregates were determined by adding 30 cc. of water to each 10 grams of an aggregate. Then an amount of the salt solution (containing 0.1 mol per liter) was added and shaken so that the aqueous phase had a low pH value, preferably of 6.8 after adsorption. The treated aggregates were then shaken with 10 cc. of a 5% solution of the wetting agents dissolved in naphtha, and the amount of aggregate coated by the wetting agent was estimated from the aggregate remaining in the aqueous phase after settling.

The proportion of the surfaces of the various aggregates covered upon being treated with the various combinations of inorganic salts and wetting agents is as follows:

TABLE 1

*The per cent figures show how much of the surfaces of the aggregates were coated by the wetting agents*

| Base exchange agent | Flint, pH 7.7 | | | Beach sand, pH 8.4 | | | Clay, pH 8.6 | | | Limestone, pH 9.0 | | |
|---|---|---|---|---|---|---|---|---|---|---|---|---|
| | A | B | C | A | B | C | A | B | C | A | B | C |
| | Per cent | Per cent | Per cent | Per cent | Per cent | Per cent | Per cent | Per cent | Per cent | Per cent | Per cent | Per cent |
| None | 0 | 0 | 0 | 0 | 0 | 0 | 30 | 30 | 30 | 0 | 0 | 0 |
| HCl | 70 | 100 | 100 | 0 | 10 | 20 | | | | | | |
| CuSO₄ | 100 | 100 | 100 | 20 | 20 | 30 | 40 | 40 | 50 | 10 | 10 | 10 |
| AgNO₃ | 100 | 100 | 100 | 100 | 100 | 100 | 60 | 60 | 70 | 40 | 40 | 40 |
| ZnSO₄ | 80 | 100 | 100 | 10 | 10 | 10 | 50 | 60 | 50 | 10 | 20 | 10 |
| HgCl₂ | 100 | 100 | 100 | 40 | 40 | 50 | 40 | 40 | 40 | 20 | 20 | 20 |
| AlCl₃ | 100 | 100 | 80 | 30 | 60 | 10 | 70 | 70 | 80 | 0 | 0 | 0 |
| PbAc₂ | 100 | 100 | 100 | 90 | 100 | 100 | 90 | 100 | 90 | 50 | 100 | 50 |
| Pb(NO₃)₂ | 100 | 100 | 100 | 100 | 100 | 100 | 100 | 100 | 100 | 100 | 100 | 100 |
| Bi(NO₃)₃ | 100 | 100 | 100 | 60 | 80 | 60 | 60 | 60 | 50 | 0 | 0 | 0 |
| FeSO₄ | 100 | 100 | 100 | 20 | 20 | 10 | 40 | 40 | 40 | 0 | 0 | 0 |
| FeCl₃ | 100 | 100 | 100 | 30 | 20 | 20 | 40 | 50 | 40 | 0 | 0 | 0 |

A = Still bottoms of vacuum distilled oxidized paraffin.
B = Tar still pitch.
C = Degras.

The following Table 2 shows what bases were effective with aggregates of various pH values:

TABLE 2

| Base exchange agent | Wetting agent |
|---|---|
| FLINT, pH 7.7 | |
| Hydrochloric acid | Tar still pitch, degras. |
| Copper sulphate | Oxidized paraffin bottoms, tar still pitch, degras. |
| Silver nitrate | Do. |
| Zinc sulphate | Tar still pitch, degras. |
| Mercuric chloride | Oxidized paraffin bottoms, tar still pitch, degras. |
| Aluminum chloride | Oxidized paraffin bottoms, tar still pitch. |
| Lead acetate and nitrate | Oxidized paraffin bottoms, tar still pitch, degras. |
| Bismuth nitrate | Do. |
| Ferrous sulphate | Do. |
| Ferric chloride | Do. |
| BEACH SAND, pH 8.4 | |
| Silver nitrate | Oxidized paraffin bottoms, tar still pitch, degras. |
| Lead acetate | Tar still pith, degras. |
| Lead nitrate | Oxidized paraffin bottoms, tar still pitch, degras. |
| CLAY, pH 8.6 | |
| Lead acetate | Tar still pitch. |
| Lead nitrate | Oxidized paraffin bottoms, tar still pitch, degras. |
| LIMESTONE, pH 9.0 | |
| Lead acetate | Tar still pitch. |
| Lead nitrate | Oxidized paraffin bottoms, tar still pitch, degras. |

The results indicate that as the pH value of the aggregates increases, the number of inorganic salts which bring about the desired effect decreases.

According to this invention, the mineral aggregate for each 1000 grams of the aggregate is coated with 30 cc. of water in which 0.1 to 3% of the base exchange agent based on the mineral aggregate is dissolved, the moist aggregate mixed with a bituminous material, such as liquid asphalt, and used as a paving mixture. The aggregate can be dried before applying the asphalt.

The adhesion was determined by immersing the moist mixture in water immediately after preparation. The aggregates used were beach sand and gravel graded to maximum density, and limestone ranging from ¼ to 1 inch in size. The preferred inorganic salts were silver nitrate, aluminum chloride, lead acetate, and lead nitrate. Wetting agents were found to materially improve the adhesion between the asphalt and the treated aggregate, the preferred wetting agents being tar still pitch and calcium, zinc or lead soaps prepared from naphthenic acids, for example those derived from Colombian fuel oil. The asphalt was 90 parts of cracking coil tar reduced to a softening point of 75° F. cutback with 10 parts of naphtha. Other asphalts and wetting agents may also be used.

The following table shows the effects of water upon alkali-bearing aggregates coated with asphalt containing wetting agents and upon alkali-bearing aggregates treated with base exchange agents and coated with asphalt containing wetting agents.

TABLE 3

*Effect of water on the asphalt coating of a mineral aggregate*

| Type and per cent of inorganic treating agent based on aggregate | Wetting agents used | | | |
|---|---|---|---|---|
| | Tar still pitch | Ca naphthenate | Pb naphthenate | Zn naphthenate |
| BEACH GRAVEL AND SAND | | | | |
| None | All displaced | All displaced | Mostly displaced | Mostly displaced. |
| 0.06% AgNO₃ | Mostly displaced | Partially displaced | Partially displaced | Partially displaced. |
| 0.05% AlCl₃ | All displaced | All displaced | Mostly displaced | Mostly displaced. |
| 0.11% PbAc₂ | None displaced | None displaced | None displaced | None displaced. |
| 0.1% Pb(NO₃)₂ | do | do | do | Do. |
| LIMESTONE | | | | |
| None | All displaced | Displaced | Displaced | Displaced. |
| 0.06% AgNO₃ | do | do | do | Do. |
| 0.05% AlCl₃ | do | do | do | Do. |
| 0.11% PbAc₂ | None displaced | None displaced | None displaced | None displaced. |
| 0.1% Pb(NO₃)₂ | do | do | do | Do. |

It was found that about 0.1% of lead salts was sufficient to insure good adhesion of the bituminous constituents and the treated mineral aggregate. To test this adhesion of the bituminous constituents and the treated mineral aggregate further, the mixtures were mechanically shaken with water, where the time in minutes required to remove the asphalt from the gravel by mechanical wear is determined. The results obtained were as follows:

TABLE 4

| Amount and type of lead salt used | Water content of aggregate | Wetting agent in asphalt | | | | |
|---|---|---|---|---|---|---|
| | | None | Tar still pitch | Ca naphthenate | Pb naphthenate | Zn naphthenate |
| | Percent | Minutes | Minutes | Minutes | Minutes | Minutes |
| None | None | 20 | 25 | 30 | 40 | |
| 0.11% lead acetate | 3 | | 50 | 80 | 110 | |
| 0.10% lead nitrate | 3 | | 100 | 130 | 170 | 170 |

The improvement in adhesion by the addition of slaked lime (0.5%) to a weathered pit gravel containing clay is illustrated by the following table, where the time in minutes required to remove the asphalt from the gravel by mechanical wear is shown:

| Slaked lime on aggregate | Wetting agent in asphalt | |
|---|---|---|
| | None | 2% lead naphthenate |
| | Minutes | Minutes |
| None | 2 | 5 |
| 0.5% | 5 | 50 |

The quantities of wetting agent in the asphalt is also of importance and the effects of the amount of wetting agent in the asphalt between 0.5 and 3% was determined. The wetting agents investigated were calcium and lead naphthenate. The durations of time in minutes necessary to start displacement of the asphalts from the sands are shown as follows:

materials for each run were mixed by hand with shovels in ten batches of 300 lbs. each in a large iron pan. The ingredients were heated and treated as shown below, after which they were thoroughly mixed.

Run No. 1.—Asphalt heated to 150° F. Aggregate heated to 130° F.

Run No. 2.—Asphalt heated to 150° F., lead naphthenate added. Aggregate treated with lead nitrate solution, dried and heated to 135° F.

Run No. 3.—Asphalt heated to 200° F. Aggregate heated to 180° F.

Run No. 4.—Asphalt heated to 200° F. Calcium naphthenate added. Aggregrate treated with lead nitrate solution, dried and heated to 160° F.

Run No. 5.—Asphalt heated to 200° F., lead naphthenate added. Aggregate treated with lead nitrate solution, dried and heated to 160° F.

The mixtures thereby obtained were placed in a circular track to a uniform thickness of 3" and lightly tamped with a hand tamper. Where cutback asphalts were used, the mixtures were cured prior to testing.

Mix. No. 1 was cured for 120 hours at 100° F.
Mix. No. 2 was cured for 132 hours at 100° F.

A wheel upon which a rubber tire was mounted was used in this test. The total load on the tire during the successive stages of the test was 980 lbs. which was distributed over a bearing area of 15.75 sq. inches.

After each mixture was laid, it was compacted

TABLE 5

Displacement of asphalt from sand

| Per cent lead nitrate on aggregate | Water content | Wetting agent | Per cent wetting agent in asphalt | | | | |
|---|---|---|---|---|---|---|---|
| | | | 0% | ½% | 1% | 2% | 3% |
| Per cent | Per cent | | Minutes | Minutes | Minutes | Minutes | Minutes |
| 0.0 | 0 | Ca naphthenate | 20 | | 30 | 30 | 30 |
| 0.1 | 3 | do | | | 80 | 130 | 140 |
| 0.0 | 0 | Pb naphthenate | | 30 | 35 | 40 | 40 |
| 0.1 | 3 | do | | 60 | 120 | 170 | 170 |

Asphaltic materials having higher melting points may be used according to this invention. Other wetting agents incorporated in the asphalt may also be used, for example fatty acids and esters of higher fatty acids and high molecular weight monohydric alcohols.

The paving mixtures prepared according to this invention were further tested to determine the stability of paving mixtures prepared by incorporating wetting agents, base exchange agents and asphalts. The cutback asphalt used in the preparation of the first three of these paving mixtures consisted of 10% of bottoms of cracking coil tar distillate and 90% of 75° F. softening point cracking coil tar asphalt. The asphalt used in the remaining two tests was a cracking coil tar asphalt of 75° F. softening point. The by rotating the wheel for 500 revolutions at a speed of 2.4 miles per hour and 1500 revolutions at a speed of 3.6 miles per hour. Profiles taken at intervals of 500 revolutions showed compaction to be complete after this period, after which the wheel was operated for a further 1500 revolutions at a speed of 2.4 miles per hour to observe any surface wear or change in profile. The surface of the mixture was then flooded with water at 77° F. to a depth of 3", and the wheel was operated in low gear until failure took place. The point of failure is reached after 50 lbs. of material has been removed by the test. At regular intervals during the test the water was drained from the track, and the aggregate which had been displaced by the action of the wheel was removed. The number of revolutions required under water to bring about failure in the runs was as follows:

fin wax bottoms, degras, calcium naphthenate, zinc naphthenate and lead naphthenate.

TABLE 6

| Run No. | | Number of revolutions for failure |
|---|---|---|
| 1 | 96% beach gravel graded to maximum density+4% cutback asphalt—cured for 120 hrs. at 100° F | 1,500 |
| 2 | 95.91% beach gravel, graded to maximum density, treated with 0.1% lead nitrate+3.91% cutback asphalt to which was added 0.08% lead naphthenate and cured for 132 hours at 100° F | 21,000 |
| 3 | 96% beach gravel graded to maximum density+4% 75° F. S. P. cracking coil tar asphalt. No curing was required | 10,500 |
| 4 | 95.91% beach gravel, graded to maximum density, treated with 0.1% lead nitrate+3.91% 75° F. S. P. cracking coil tar asphalt to which was added 0.08% calcium naphthenate. No curing was required | 37,000 |
| 5 | 95.91% beach gravel, graded to maximum density, treated with 0.1% lead nitrate+3.91% 75° F. S. P. cracking coil tar asphalt to which was added 0.08% lead naphthenate. No curing was required | 70,000 |

From the above results it is shown that the addition of wetting and base exchange agents increases the number of revolutions for failure from 1,500 to 21,000 where a cutback asphalt is used, and from 10,500 to 37,000 and 70,000 where a semi-solid asphalt is used.

It is not the intention to limit this invention to the specific examples given. It is the applicant's intention to claim this invention as broadly as the prior art permits.

I claim:

1. A paving composition comprising a mineral aggregate coated with a water-soluble salt selected from the group consisting of silver, copper, aluminum and iron groups and bonded with an asphalt containing a wetting agent selected from the group consisting of oxidized paraffin wax bottoms, tar still pitch, degras, calcium naphthenate, zinc naphthenate, and lead naphthenate.

2. A paving composition comprising a mineral aggregate coated with lime and bonded with an asphalt containing a wetting agent selected from the group consisting of oxidized paraffin wax bottoms, tar still pitch, degras, calcium naphthenate, zinc naphthenate, and lead naphthenate.

3. A paving composition comprising a mineral aggregate coated with an aqueous solution of a water-soluble salt selected from the group consisting of silver, copper, aluminum and iron, the water evaporated and the dry mineral aggregate bonded with an asphalt containing a wetting agent selected from the group consisting of oxidized paraffin wax bottoms, tar still pitch, degras, calcium naphthenate, zinc naphthenate, and lead naphthenate.

4. A paving composition coated with a water-soluble salt of lead and bonded with an asphalt containing a wetting agent selected from the group consisting of tar still pitch, oxidized paraffin wax bottoms, degras, calcium naphthenate, zinc naphthenate and lead naphthenate.

5. A paving composition comprising a mineral aggregate coated with a water-soluble salt of lead and bonded with an asphalt containing calcium naphthenate in solution.

6. A paving composition comprising a mineral aggregate coated with a water-soluble salt of lead and bonded with an asphalt containing lead naphthenate in solution.

7. A paving composition comprising a mineral aggregate coated with a water-soluble salt of lead and bonded with an asphalt containing zinc naphthenate in solution.

8. A paving composition comprising a mineral aggregate coated with lead nitrate and bonded with an asphalt containing a wetting agent selected from the group consisting of oxidized paraffin wax bottoms, tar still pitch, degras, calcium naphthenate, zinc naphthenate, and lead naphthenate.

9. A method of preparing a paving composition which comprises coating a mineral aggregate with a water-soluble salt of lead and bonding the mineral aggregate with an asphalt containing calcium naphthenate.

10. A method of preparing a paving composition which comprises coating a mineral aggregate with a water-soluble salt of lead and bonding the mineral aggregate with an asphalt containing lead naphthenate.

11. A method of preparing a paving composition which comprises coating a mineral aggregate with a water-soluble salt of lead and bonding the mineral aggregate with an asphalt containing zinc naphthenate.

12. A method of preparing a paving composition which comprises coating a mineral aggregate with lead nitrate and bonding the mineral aggregate with an asphalt containing calcium naphthenate.

CHARLES MACK.